United States Patent [19]

Propster

[11] 4,338,112

[45] Jul. 6, 1982

[54] METHOD FOR CONTROLLING PARTICULATE EMISSIONS FROM A GLASS FURNACE

[75] Inventor: Mark A. Propster, Gahanna, Ohio

[73] Assignee: Owens-Corning Fiberglas Corporation, Toledo, Ohio

[21] Appl. No.: 245,302

[22] Filed: Mar. 19, 1981

[51] Int. Cl.³ .............................................. C03B 1/00
[52] U.S. Cl. .......................................... 65/27; 65/28; 65/134; 165/111; 209/11; 209/45; 209/129; 209/133
[58] Field of Search ....................... 65/27, 28, 62, 134, 65/335; 165/111; 209/11, 45, 47, 129, 130, 133, 285

[56] References Cited

U.S. PATENT DOCUMENTS

| | | | |
|---|---|---|---|
| 1,335,758 | 4/1920 | Schmidt | 209/129 |
| 2,560,047 | 7/1951 | York et al. | 209/129 X |
| 2,592,783 | 4/1952 | Aspegren | 165/111 |
| 4,029,572 | 6/1977 | Theodore et al. | 209/11 |
| 4,144,359 | 3/1979 | Zahedi et al. | 427/39 |
| 4,145,202 | 3/1979 | Grodin et al. | 65/28 X |

OTHER PUBLICATIONS

"Application of Electrified Filter Bed Technology to Glass Melting Furnace Emissions", EFB, Inc., 78 Cummings Park, Woburn, Mass. 01801, 5-5-80.

"Proposal for Rental of an EFB Pilot Unit Demonstration System", EFB, Inc., 78 Cummings Park, Woburn, Mass. 01801, 5-5-80.

Primary Examiner—Arthur D. Kellogg
Attorney, Agent, or Firm—Ronald C. Hudgens; Patrick P. Pacella

[57] ABSTRACT

A process for the manufacture of glass is disclosed. Dried glass batch agglomerates are used as the media in an electrified filter bed, preheated with furnace exhaust gases, and then fed to a glass melting furnace. Exhaust gases from the preheating are electrically charged and passed through the electrified bed of agglomerates to remove glass batch particulate from the spent gases.

12 Claims, 2 Drawing Figures

METHOD FOR CONTROLLING PARTICULATE EMISSIONS FROM A GLASS FURNACE

TECHNICAL FIELD

This invention relates to a process for reducing the particulate emissions in the exhaust gas from a glass melting furnace.

BACKGROUND ART

Methods are known in the art for glass manufacturing wherein glass-forming, batch ingredients are compacted into agglomerates and then are dried and heated in a chamber by a direct contact with flue gases from a glass melting furnace so as to produce free-flowing agglomerates which are then conveyed and discharged to the glass melting furnace. These agglomerates are composite, integral, self-supporting masses consisting essentially of all the substantial batch materials and may take the form of balls, extrusions, discs, briquettes, and pellets. The agglomerates are discharged to a vertical bed contained within a chamber and furnace flue gases pass, in direct contact with and countercurrently to, downwardly moving pellets of the bed to preheat them.

One method known in the art to form the agglomerates is to combine the glass forming batch ingredients with water. In the context of drying and heating water-containing, glass batch agglomerates with flue gases from a fossil fuel fired melting furnace, the most desirable process equipment is a shaft type heater, or chamber, i.e., a vertical bed of substantial height, and preferably a bed in which the agglomerates flow downwardly through the chamber and in which the flue gases flow countercurrent to the agglomerates, to substantially continuously, in a single processing operation, dry and preheat them.

This drying and preheating of agglomerates at times may generate high particulate emissions in the flue gases exhausting from the chamber. These emissions primarily are due to agglomerate spalling in the drying zone of the chamber or high superficial gas velocity through the chamber.

DISCLOSURE OF INVENTION

According to this invention, I have provided a means for reducing the particulate emissions in the exhaust gas stream from a glass melting furnace. The exhaust gas stream first is passed through a vertical bed preheat hopper and then through an electrified filter bed. In the hopper the furnace exhaust gases are moving in direct contact with and countercurrently to a vertical bed of glass batch agglomerates. After passing through the preheat hopper, the exhaust gas stream is electrically charged before passing through the electrified filter bed. The media of the filter bed becomes coated with the charged particulate of the gas stream. The clean exhaust gases are vented to the atmosphere. Agglomerated glass batch is fed to a predryer to remove water. The agglomerates are then fed to the electrified filter bed and used as the media for the filter bed. The coated agglomerates then are preheated in the vertical bed hopper and fed to the glass melting furnace. A portion of the cool exhaust gas from the vertical bed hopper bypasses the electrified filter bed and dries the agglomerates in the predryer. The exhaust gas from the predryer then is electrically charged and recycled back to the electrified filter bed.

BEST MODE OF CARRYING OUT INVENTION

Generally, this invention is employed in a glass melting furnace from which molten glass issues. A shaft type preheater maintains a vertical bed of agglomerates, with the preheater preferably containing an upper substantially cylindrical portion and a lower inverted frusto-conical portion. Hot exhaust gases are conveyed to a lower portion of the preheater and passed countercurrently to the gravitationally downwardly flow of the agglomerates therein so as to preheat the agglomerates to an elevated temperature. The agglomerates, in turn, remove any volatiles from the furnace exhaust gas. The heated agglomerates are discharged from the lower portion of the preheater and without significant cooling, are directly transmitted to a glass melting furnace.

Figure 1:
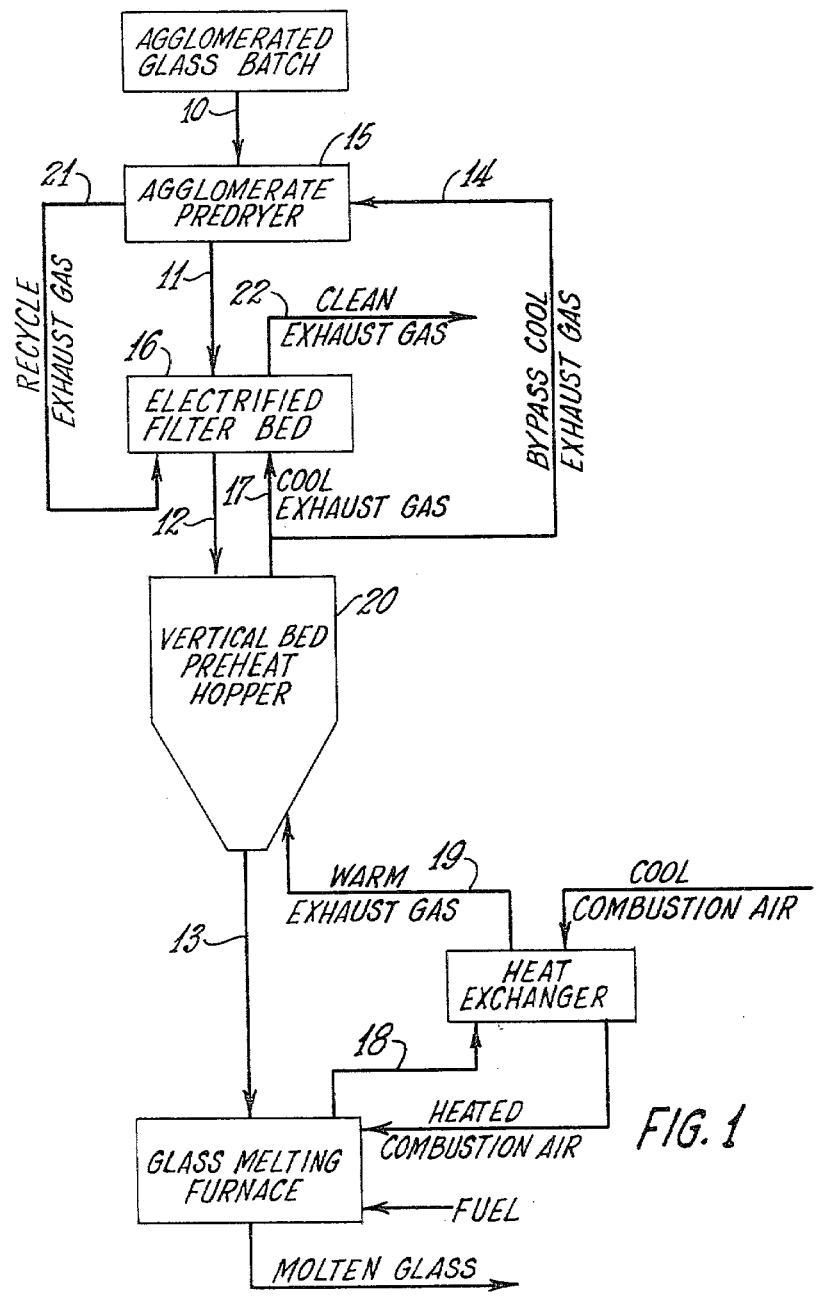
FIG. 1 is a flow diagram of the electrified filter bed of this invention in connection with a conventional glass melting furnace, shaft type hopper and predryer.

In FIG. 1, agglomerated glass batch 10 is fed countercurrently to the flow of cool exhaust gas 14 in predryer 15. Dried agglomerates then are discharged to electrified filter bed 16 via stream 11. Cool exhaust gas 17 flows countercurrently to the electrified agglomerate bed 16. Coated agglomerates then are conveyed to preheat hopper 20 via stream 12. Hot exhaust gas 18 from a glass melting furnace is passed through a heat exchanger prior to entering preheat hopper 20. The warm exhaust gas from the heat exchanger is fed countercurrently to preheat hopper 20 via stream 19. Heated agglomerates then are fed to the glass melting furnace via stream 13.

Exhaust gas 21 from predryer 15 may be recycled to bed 16 for cleaning prior to venting to the atmosphere via stream 22. Exhaust gas via stream 17 is similarly cleaned and vented via stream 22 as discussed in the next paragraph.

Figure 2:
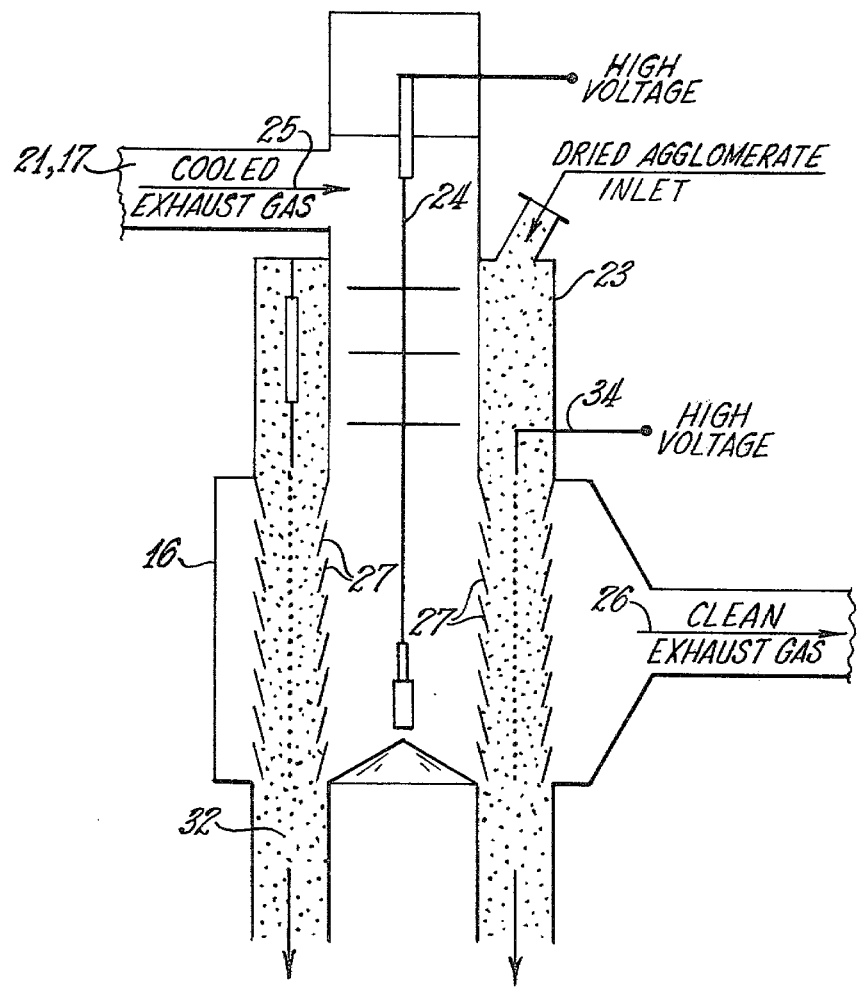
FIG. 2 illustrates the electrified filter bed of this invention in more detail.

In FIG. 2, the flow of exhaust gas 21 and 17 through filter bed 16 is shown in greater detail. The basic filter unit of the invention comprises filter 23 and electrical charger 24. Filter 23 is arranged so as to intersect a gas flow path between cooled exhaust gas 25 and clean gas outlet 26. Flow directing baffles 27 are employed in filter 23. A conventional blower or fan (not shown) may be employed to push or pull the gas stream through filter bed 16.

Filter 23 is packed with filter bed medium 32. Filter bed medium 32 generally is a dry bed of agglomerates fed via stream 11 in FIG. 1. A high voltage supply 34 provides a uniform electric field to the agglomerated filter bed. In an embodiment not shown, the electric field is maintained through the preheat hopper.

A suitable electrical charger 24 also is provided. Particulate entrained in exhaust gas 25 is electrically charged when they pass through the region containing electrical charger 24. The electric field formed by high voltage source 34 effectively polarizes the bed agglomerates of filter 23, producing caps of positive and negative charges on each agglomerate. The charge caps then act as collection sites for previously charged particulate in exhaust gas stream 25.

In the embodiment shown in FIG. 2, filters 23 extend from electrified filter bed 16 to form streams 12 for feeding hopper 20. The streams may be joined for feeding hopper 20 or multiple streams may be employed. In an embodiment not shown, high voltage source 34 may extend through hopper 20 to maintain polarization of the agglomerates until they pass through hopper 20 and are charged to the glass melting furnace.

INDUSTRIAL APPLICABILITY

In operation, the agglomerates of filter bed 23 become coated with collected particulate. When the desired amount of coating has taken place, the spent bed agglomerates are charged to hopper 20, preheated and fed to a glass melting furnace. The temperature of exhaust stream 19 is about 1500° F. (816° C.) and the agglomerates are heated to a temperature ranging from about 900° F. (482° C.) to 1450° F. (788° C.) by the exchange in hopper 20.

A portion of exhaust gas leaving hopper 20 is used to dry the agglomerates in predryer 15. Exhaust streams 14 and 17 usually are about 300° F. (149° C.). In an embodiment not shown, a by-pass stream from hopper 20 to stream 14 can be used to carry exhaust gases with a higher, but acceptable temperature to predryer 15. This hotter stream of exhaust gases will be taken from below the top of the agglomerated bed in hopper 20. Water is removed before the agglomerates are charged to electrified filter bed 16. Exhaust stream 21 may be recycled to electrified filter bed 16 for cleaning before venting to the atmosphere.

I claim:

1. A process for producing glass by (1) charging to a melting furnace and melting therein a batch including the steps of compacting the batch into agglomerates, (2) drying the agglomerates, (3) forming a bed with the dried agglomerates and electrically charging the bed, (4) subsequently forming a vertical bed with the agglomerates, (5) moving the agglomerates in the vertical bed in direct contact with and countercurrently to, hot furnace exhaust gases, (6) electrically charging the spent exhaust gases which have passed through the vertical bed, and (7) passing the charged exhaust gases through the electrified bed of step (3).

2. A process according to claim 1 wherein the spent exhaust gases contain glass batch particulate which are charged in step (6).

3. A process according to claim 2 wherein the charged glass batch particulate is removed from the spent exhaust gases by coating the agglomerates when step (7) is carried out.

4. A process according to claim 1 wherein the drying of step (2) is carried out with a portion of the uncharged, exhaust gases which have passed through the vertical bed formed in step (4).

5. A process according to claim 1 wherein the electric charge applied to the dried agglomerate bed in step (3) is maintained through the vertical bed formed in step (4).

6. A process according to claim 1 wherein the drying of step (2) is carried out with a portion of uncharged, exhaust gases which only partially have passed through the vertical bed formed in step (4).

7. A process for producing glass by charging to a melting furnace and melting therein a batch comprising the steps of (1) agglomerating the batch using a liquid, (2) drying the agglomerates, (3) forming a bed with the dried agglomerates and electrically charging the bed, subsequently (4) charging the agglomerates onto the upper surface of a vertical bed preheat hopper having a lower discharge end communicating with the furnace, substantially simultaneously (5) withdrawing agglomerates through said lower discharge end for charging to the furnace, (6) moving the remaining agglomerates by gravity downwardly through the vertical bed, (7) passing the hot furnace exhaust gas upwardly through the vertical bed to heat the agglomerates therein, (8) electrically charging the exhaust gases which have passed through the vertical bed, and (9) passing the charged exhaust gases through the electrified bed of step (3).

8. A process according to claim 7 wherein the spent exhaust gases contain glass batch particulate which are charged in step (8).

9. A process according to claim 8 wherein the charged glass batch particulate is removed from the spent exhaust gases by coating the agglomerates when step (9) is carried out.

10. A process according to claim 7 wherein the drying of step (2) is carried out with a portion of the uncharged, spent exhaust gases which have passed through the vertical bed.

11. A process according to claim 7 wherein the electric charge applied to the dried agglomerate bed in step (3) is maintained through the vertical bed formed in step (4).

12. A process according to claim 7 wherein the drying of step (2) is carried out with a portion of uncharged exhaust gases which only partially have passed the vertical bed formed in step (4).

* * * * *